United States Patent [19]
Johansson et al.

[11] 3,951,326
[45] Apr. 20, 1976

[54] APPARATUS FOR EXPLOSION WELDING OF A COVERING PLATE TO A BED PLATE OF ANOTHER METAL

[75] Inventors: Johan Ingvar Johansson; Rune Östen Walter Fredriksson, both of Avesta, Sweden

[73] Assignee: Avesta Jernverks Aktiebolag, Avesta, Sweden

[22] Filed: Aug. 30, 1974

[21] Appl. No.: 502,029

[52] U.S. Cl. .................................. 228/2.5; 228/107
[51] Int. Cl.² ......................................... B23K 21/00
[58] Field of Search........... 228/3, 47, 2.5, 107–109; 29/470.1, 421 E, 486, 497.5

[56] References Cited
UNITED STATES PATENTS

| | | | |
|---|---|---|---|
| 2,158,664 | 5/1939 | Lytle et al. | 228/47 |
| 3,377,010 | 4/1968 | Suzuki et al. | 29/470.2 |
| 3,432,912 | 3/1969 | Doherty, Jr. et al. | 228/3 |

*Primary Examiner*—Al Lawrence Smith
*Assistant Examiner*—Margaret Joyce

[57] ABSTRACT

A thin sheet of corrosion resistant metal is welded to a plate of structural metal by explosion welding by means of an apparatus including an elongated blasting charge holder for accommodating blasting charges, an associated elongate support, and means for pressing the thin corrosion resistant metal sheet and the structural metal plate between the blasting charge holder and the support while detonating the blasting charge.

5 Claims, 11 Drawing Figures

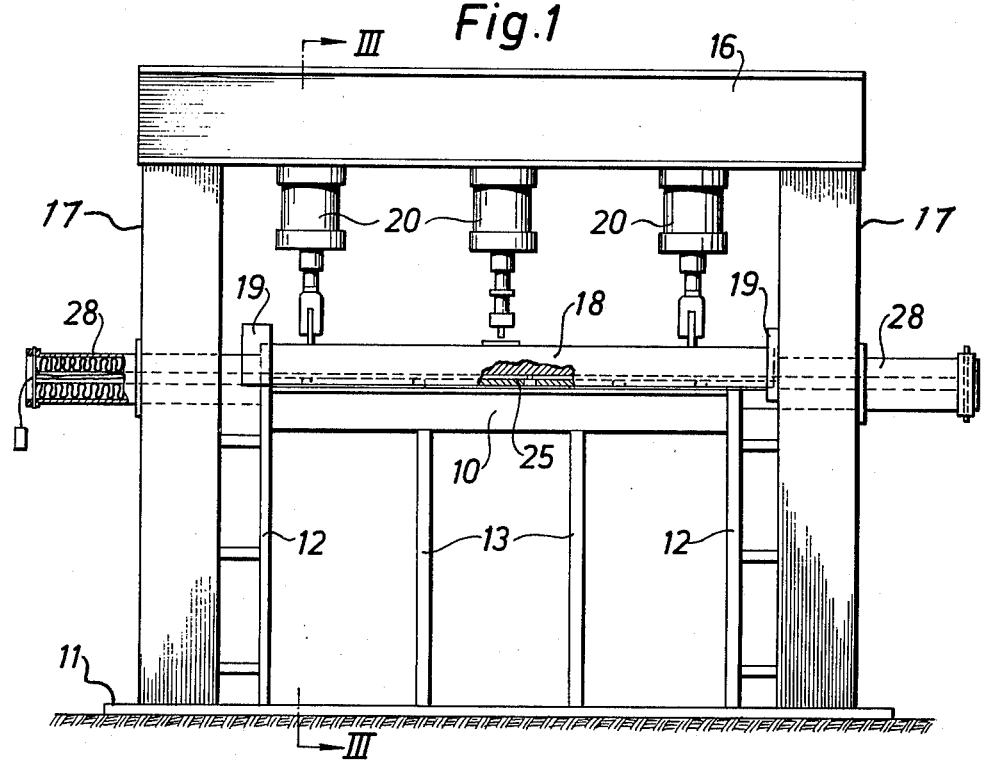
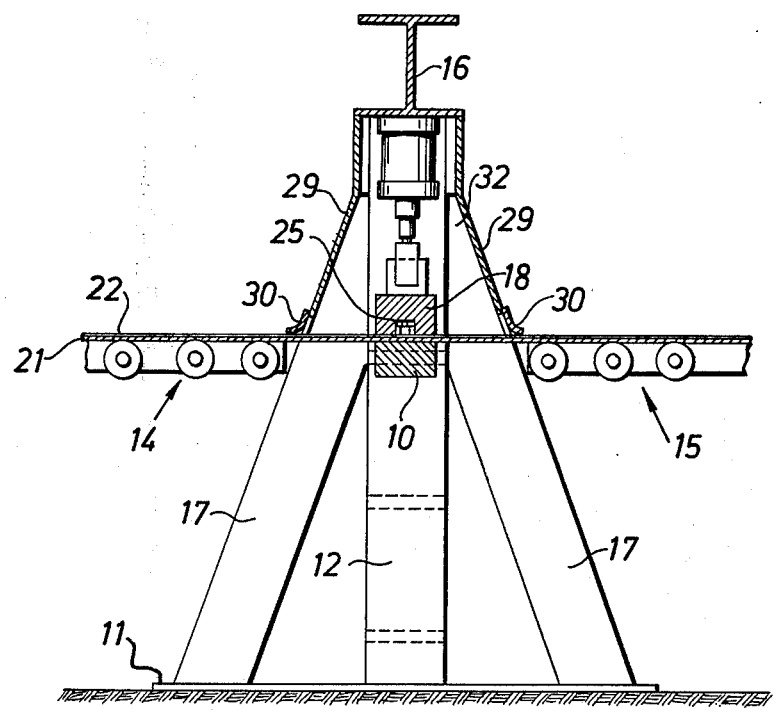

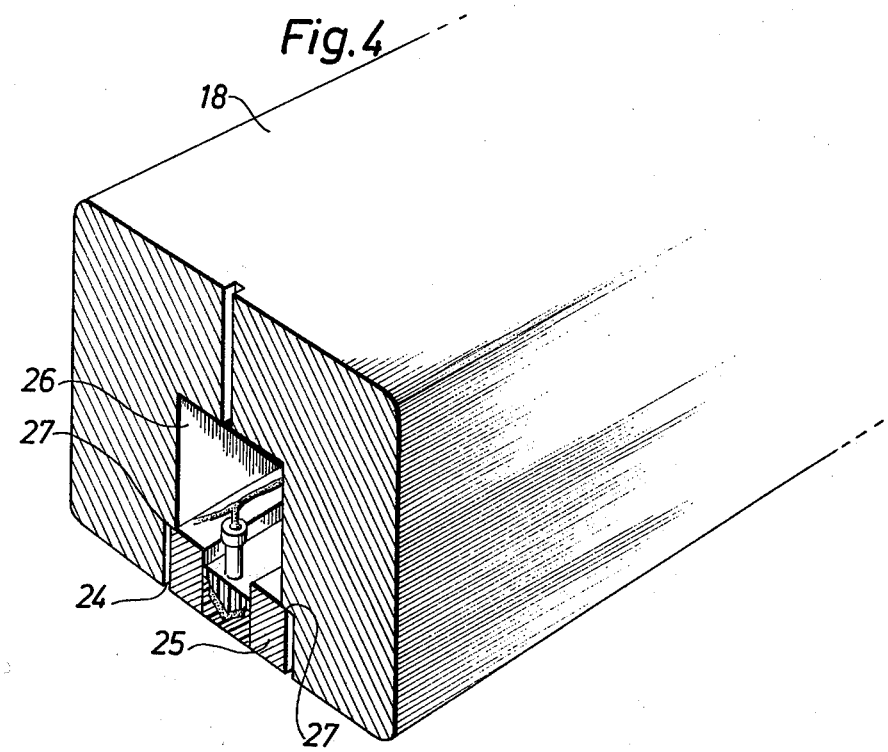
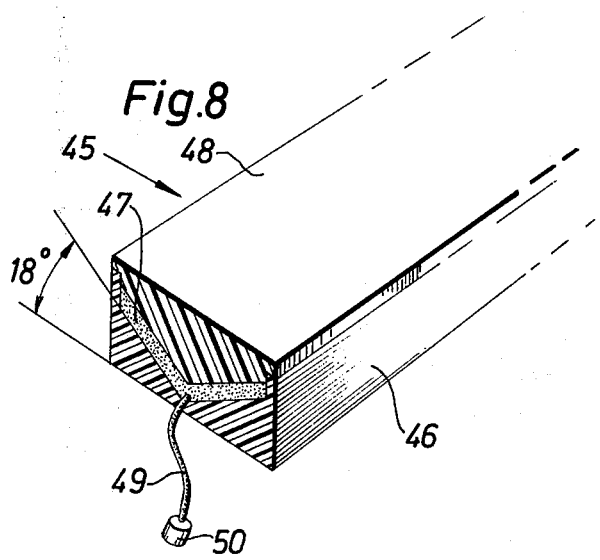

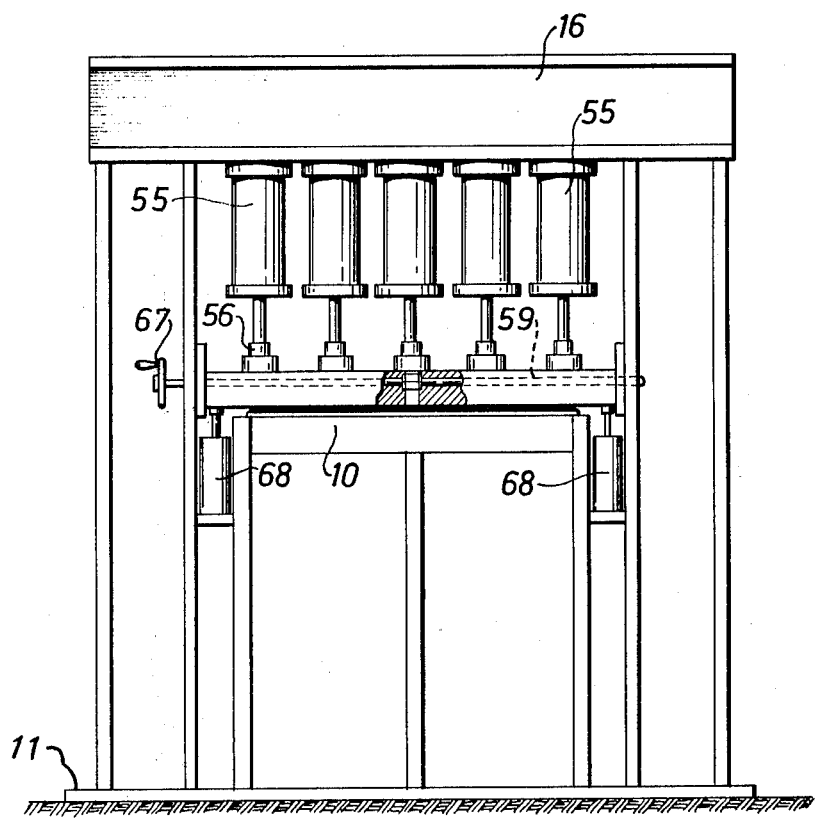

APPARATUS FOR EXPLOSION WELDING OF A COVERING PLATE TO A BED PLATE OF ANOTHER METAL

The present invention refers to an apparatus for point-to-point or continuous explosion welding of a generally thin covering plate of a corrosion-resistant metal and a generally thick bed plate of some other metal, mainly steel, applying blasting charges that are adapted to the requirements of explosion welding.

Blasting charges of the type mentioned are already known, for instance by the publicly available Swedish patent application No. 15135/71 (Nitro Nobel AB).

The apparatus according to the invention is intended primarily to be used for fastening on to a bed plate by means of explosion welding a covering plate of titanium or some similar, extremely corrosion-resistant metal that cannot be attached to other metals by conventional welding. The machine may also be used to advantage in many cases for fastening a covering plate of copper, stainless steel or some other metal on to a bed plate.

The apparatus according to the invention is characterized in particular by comprising (i) a fixed, horizontal support beam, above which is (ii) another beam, which is designed to act as a blasting-charge holder and performs a guided, reciprocating, vertical, translational motion, (iii) means for moving the said blasting-charge holding beam from an upper limit position at which this beam permits free displacement of the bed plate and the covering plate resting thereupon, to a lower position at which the covering plate is pressed against the bed plate, and (iv) means for detonating a number of blasting charges fitted in the said holding beam.

Preferably the means for moving the blasting-charge holding beam comprise pneumatic cylinders or some similar device by means of which the plate package in each feed position can be pressed together between the support beam and the holding beam before the blasting charges fitted in the latter are detonated.

In a preferred embodiment of the apparatus according to the invention the underside of the blasting-charge holding beam is designed with a longitudinal channel for the incorporation of a so-called blasting-charge rod, which is a rod of wood or similar material in which a number of blasting charges are fitted at intervals, the blasting charges being detonated simultaneously by means of a common detonator.

In a modified embodiment of the apparatus according to the invention the blasting-charge holding beam is designed with a row of through holes at suitable intervals, the said holes accommodating individual blasting cartridges, each with its detonator. Each of these chambers has its own striking-pin mechanism fitted in a clamping holder that can be moved downward by a pneumatic cylinder or similar device until it presses against the blasting-charge holding beam, which is thereby forced to press the two plates in the plate package against each other at the moment of detonation. The holding beam may also contain a longitudinal camshaft, which when being turned by a handle or similar device causes simultaneous stretching and subsequent release of striking-pin springs, each actuating its individual striking pin, thus causing simultaneous detonation of all the blasting cartridges with an ensuing point-by-point joining of the covering plate and the bed plate. The striking pins may also be arranged rigidly in their respective clamping holders.

Additional characteristics of the apparatus according to the invention will be clear from the following detailed description of a number of embodiments with reference to the attached drawings.

On the drawings:

FIG. 1 is a front view of one embodiment of the apparatus;

FIG. 3 is section along the III—III plane in FIG. 1;

FIG. 4 is a perspective transverse section on a larger scale of the blasting-charge holding beam of the apparatus according to FIGS. 1–3;

FIG. 8 is a perspective view of a blasting-charge rod of a modified design, comprising only one blasting charge, for linear explosion welding;

FIG. 9 is a front view of an apparatus according to another embodiment of the invention;

Figure 2:
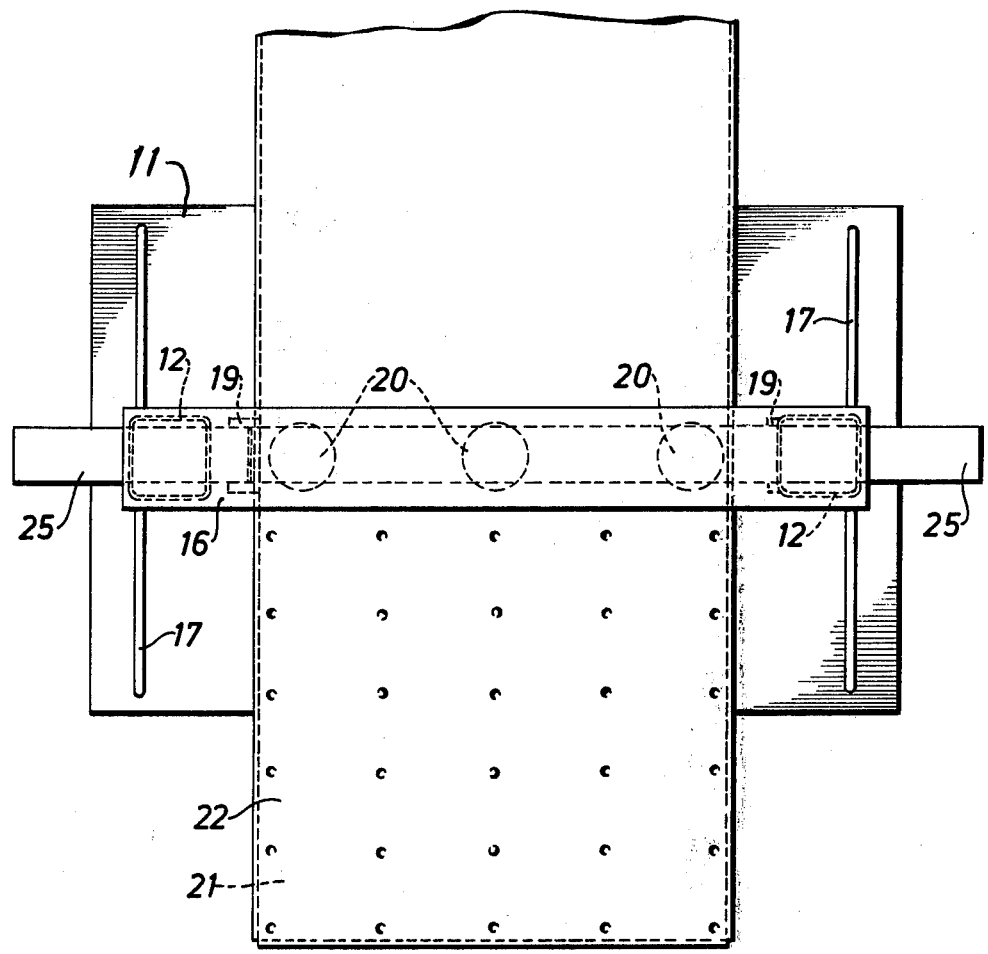
FIG. 2 is a top-plan view of the same apparatus.

In FIGS. 1–3, reference 10 denotes a horizontal support beam, which forms part of the machine frame and is carried at a suitable height above a foundation plate 11 by means of two uprights 12 at its ends and two intermediate supports 13. A front roller way 14 (FIG. 3) and a rear roller way 15 are arranged at the same level as the horizontal top surface of the support beam 10. A horizontal upper frame beam 16 is fitted vertically above the support beam 10 and is supported at each end by two support legs 17 diverging downwards and resting on the foundation plate 11.

Immediately above the support beam 10 an additional beam 18 for carrying the blasting charges is arranged movable upwards and downwards while being guided at its ends by fixed vertical guides 19. Three pneumatic cylinders 20, the piston rods of which are connected with the beam 18, are suspended from the upper frame beam 16.

The package of plates to be joined, i.e., a comparatively thick bed plate 21 of steel or other suitable metal and a comparatively thin covering plate 22, which rests on the bed plate, is fed step by step while resting on the roller ways 14, 15 through the open space between the support beam 10 and the beam 18 for carrying blasting charges when the latter beam has reached its uppermost position. The covering plate 22 is generally made of titanium or some other very corrosion-resistant metal that cannot be conventionally welded on to other metals. As can be seen from FIG. 6 the two plates 21, 22 are interspaced by strips 23 of metal, plastics or similar material, which maintain a suitable distance (about 0.5 mm) between the plates. Both the bed plate and the covering plate are ground to a surface finish corresponding to emery no. 80 or better in the areas to be joined together.

As is best seen from FIG. 4 the underside of the blasting-charge carrying beam 18, which has a substantially rectangular cross section, comprises a comparatively shallow longitudinal channel 24 of rectangular cross section, the said channel being intended for incorporating a blasting-charge rod 25 to be described in more detail below. The channel 24 communicates upwardly with another longitudinal channel 26, which also has a rectangular cross section but is less wide and less shallow than channel 24. The bottom of channel 24 on each side of channel 26 forms a narrow stop face 27. When the beam 18 for carrying blasting charges is in its lowest position, i.e., in contact with the plate package, a guide pipe 28 (FIG. 1) the outer part of which is preferably designed as a sound trap, is aligned with channel 24 at each end.

Two swing doors 29 (FIG. 3) are hinged at their upper edge on the frame beam 16. When pendent the swing doors rest in a sloping position against the plate package 21, 22 with a flexible gasket 30 fitted at the lower edge of each door, while defining together with fixed walls a space 32 that communicates with a suction fan (not illustrated) for evacuating the combustion gases.

Figure 5:
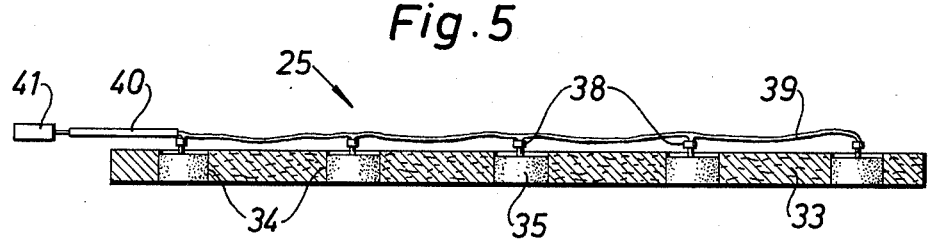
FIG. 5 is a longitudinal section of a blasting-charge rod to be used in the apparatus according to FIGS. 1–3.
Figure 6:
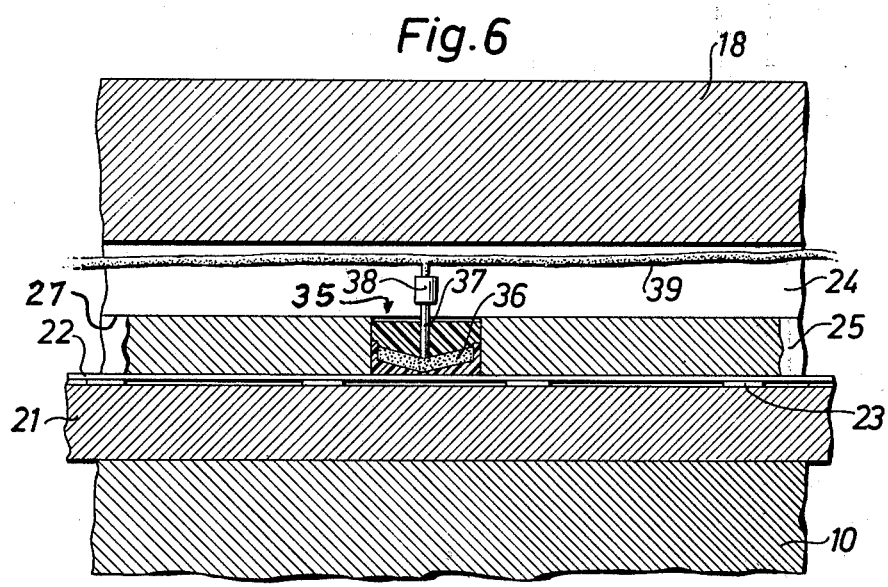
FIG. 6 is a partial section on a larger scale of the blasting-charge rod according to FIG. 5, as fitted in place in the apparatus according to FIGS. 1–3.

One embodiment of a blasting-charge rod designed to be used with the machine according to FIGS. 1–4 is shown in FIGS. 5 and 6.

According to the said Figures a rod 33 of wood or other suitable material, with a rectangular cross section that fits into the wider rectangular channel 24 of the beam 18, incorporates a number of equidistant round holes 34 that pass through the rod, each hole accommodating a blasting cartridge (denoted 35 in its entirety). The cartridges mainly coincide with the cartridge illustrated in FIG. 6 of the Swedish patent application No. 15135/71 mentioned in the introduction. In a cylindrical plastics capsule with a conical bottom a layer 36 of a suitable explosive, such as phlegmatized pentaerythritoltetranitrate, is placed at the bottom. The lower part 37 of an instantaneous igniter 38 is entered at the centre through the capsule cover. All these igniters are interconnected by shock fuses 39 comprising a plastics tubing the inner wall of which carries a thin layer of a special explosive. The instantaneous igniter 38 at one end of the rod 33 is connected with a shock fuse 40 whose free end is connected with a blasting cap 41.

Figure 7:
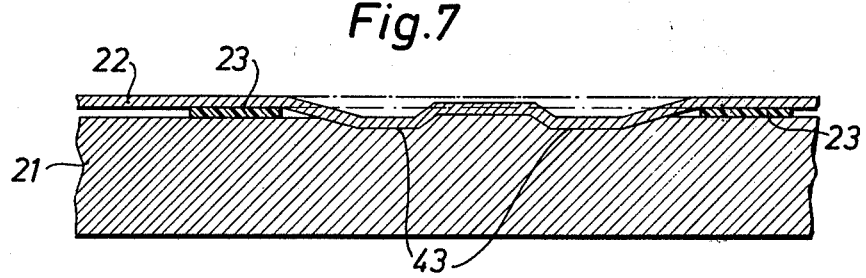
FIG. 7 is a partial section on a larger scale of a spot joint between the covering plate and the bed plate.

The apparatus as described operates in the following way:

When the plate package 21, 22 has been fed to its intended position between the support beam 10 and the beam 18, which is then in its uppermost position, two thin shims (not illustrated) are placed on the plate package, one at each side and vertically below the beam 18. The two outer pneumatic cylinders 20 are then actuated, causing the beam 18 to move downward until it reaches the said thin shims, after which a blasting-charge rod 25 is inserted through one of the guide pipes 28 to its position in the rectangular channel 24 underneath the beam 18, which is then first elevated slightly by means of the pneumatic cylinders 20, enabling the thin shims to be withdrawn, and is then lowered so that it presses against the plate package 21, 22, causing the stop faces 27 (FIG. 4) to engage with the blasting-charge rod 25 and pressing it down into full-length contact with the covering plate 22, at the same time pressing this thin titanium plate 22 as far down against the thick steel plate 21 as permitted by the interspacing strips 23 between the said plates. The blasting cap 41 at the end of the shock fuse is then inserted in a suitable striking-pin mechanism (not illustrated), which is then released, causing all charges in the rod 25 to detonate almost simultaneously. The pressure wave from each individual charge strikes the titanium plate 22 at an oblique angle within an annular zone 43 (FIG. 7) round the centre of the charge, joining the thin titanium plate in this area to the thick steel plate as can be seen from FIG. 7. The combustion gases that develop are collected in the chamber 32 and are subsequently removed by the evacuation fan (not illustrated).

The beam 18 for carrying the blasting charges is then elevated by the pneumatic cylinders 20 to its uppermost position, one of the doors 29 is swung out, any wooden and plastics parts that may remain are removed from the channel 24 at the underside of the beam 18, the plate package 21, 22 is advanced to its next explosion-joining position, and the same sequence of events is repeated.

FIG. 8 illustrates a blasting-charge rod 45 of a somewhat modified design, which is used in producing linear joints across the plate package 21, 22. This rod 45 comprises a lower rod portion 46 made of wood, plastics or other suitable material, which on its upper aspect has a chute with two plane delimiting surfaces sloping toward each other, the said surfaces being covered with a layer 47 of explosive, such as phlegmatized pentaerythritoltetranitrate (PETN), and an upper rod portion 48 that fits into the said chute. From the PETN layer 47 a shock fuse 49 passes at one end of the rod and is connected with a blasting cap 50 at its free end. The complete blasting-charge rod 45 has the same cross section as the rod 25 shown in FIGS. 5 and 6 and thus fits into the channel 24 at the underside of the beam 18 for carrying blasting charges in the machine illustrated in FIGS. 1–4. In the present case, however, the pressure wave strikes the covering plate along two band-shaped zones that run parallel with the blasting-charge rod, one on each side of the rod axis, causing linear joining of the plates.

The bed plate 21 of steel or similar material to which a covering plate 22 of a more corrosion-resistant metal is to be joined by means of explosion joining in the machine according to FIGS. 1–4, is generally of considerable thickness, in many cases over 10 mm. Such plates are never quite plane under practical conditions. Considering the importance of maintaining a distance between the bed plate and the covering plate close to 0.5 mm at each point in the joining zone for obtaining an efficient explosion joint, the beam 18 has to be so rigid and the pneumatic cylinders 20 have to be designed in such a way as to develop forces of pressure against the beam that make it engage in its full length with the bed plate, straightening it plane in the transverse direction and forcing it into full contact at each point with the horizontal support beam 10. The maximum thrust of each pneumatic cylinder 20 should generally be in the range 3–10 tons.

According to another method of securing the desired distance between the covering plate and the bed plate in the joining zone the bed plate may be bent in a bending machine prior to the explosion joining process until it attains its desired final radius of curvature, or it may be bent to a greater radius of curvature. As is well known the bending process will straighten the bed plate perpendicularly to the direction of bending and the generatrix of the bent plate will remain straight on completion of the bending procedure. Hence in this case the beam 18 need not exert any straightening effect on the bed plate. In explosion joining of a covering plate and a bed plate bent into a cylindrical shape it is of advantage to use a beam 10 whose underside has a similar curvature. It is also possible to narrow the contact surface of the beam by bevelling it at one or both of its lower longitudinal edges. The roller ways 14, 15 on each side of the support beam 10 should be adjustable to the radius of curvature of the bed plate, for instance by making the rollers adjustable vertically.

Figure 10:
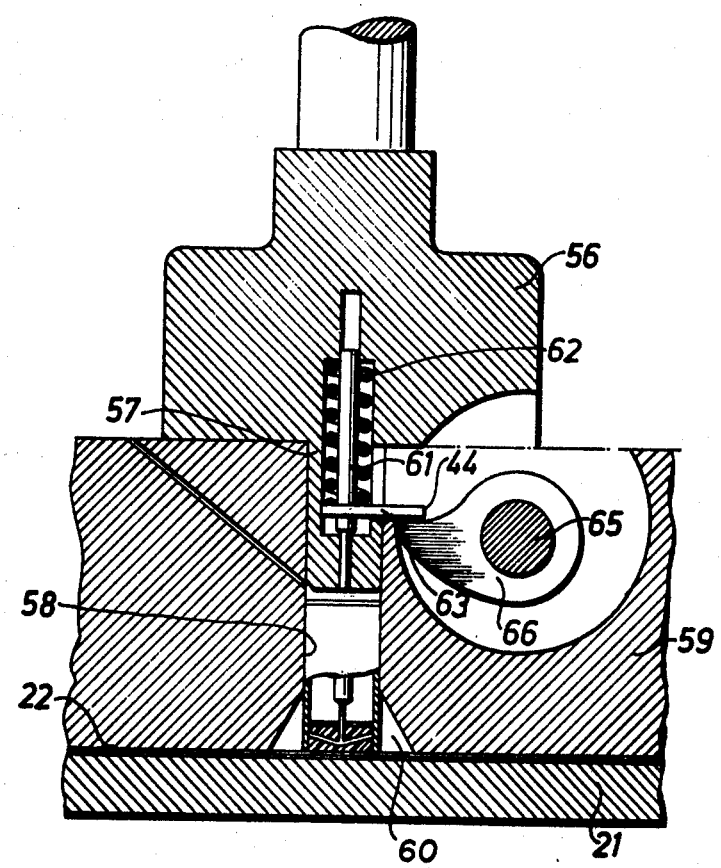
FIG. 10 is a partial section on a larger scale along the X—X plane in FIG. 9, in an apparatus with spring-actuated striking-pin mechanisms.

In the embodiment of the apparatus according to the invention as shown in FIGS. 9 and 10 almost simultaneous detonations of a number of blasting-charge units are achieved by individual striking-pin mechanisms that are released simultaneously. Five pneumatic cylinders 55 project from the underside of the upper frame beam 16, one cylinder for each explosion-joining spot. The free end of the piston rod of each pneumatic cylinder is designed as a clamping holder 56 with a central cylindrical extension 57 (FIG. 10) projecting downward. These extensions 57 are intended to enter corresponding individual through holes 58 in the combined pressure and cartridge-holding beam 59. Each bore should be widened conically at its lower end, forming a combustion chamber 60. An axial bore through the clamping holder 56 and its extension 57 accommodates a striking pin 61, which is actuated by a striking-pin spring 62 that presses against a radially projecting dog 63 fixed on to the striking pin. The lower portion of each bore 58 contains a blasting cartridge 64 with a blasting charge and a blasting cap at its upper end. The cartridge-holding beam 59 incorporates a longitudinal rotatory shaft 65 with a cam 66 engaging with the dog 63 positioned in front of each cartridge. A hand-wheel 67 is used for turning the camshaft 65 whereas two pneumatic cylinders 68 are incorporated for elevating the combined pressure and cartridge-holding beam 59 to its uppermost position.

The apparatus according to FIGS. 9 and 10 operates as follows:

When the package consisting of the bed plate 21 and the covering plate 22 has been fed to its correct position in the space between the support beam 10 and the cartridge-holding beam 59, which is then in its uppermost position, the pneumatic cylinders 55 are actuated, causing the clamping holders 56 in conjunction with the cartridge-holding beam 59 to press the titanium plate 22 strongly against the interspacing strips between the two plates, which are thereby fixed at a suitable internal distance of about 0.5 mm. The camshaft 65 is then turned by the hand-wheel 67, causing all the striking-pin springs 62 to be further compressed and then released simultaneously when the camshaft has been turned by a predetermined angle, the pins then striking the blasting caps and initiating detonation of each individual blasting cartridge. The combustion chamber 60 causes the pressure wave following from the detonation to develop in a way that suits the intended explosion joining.

Figure 11:
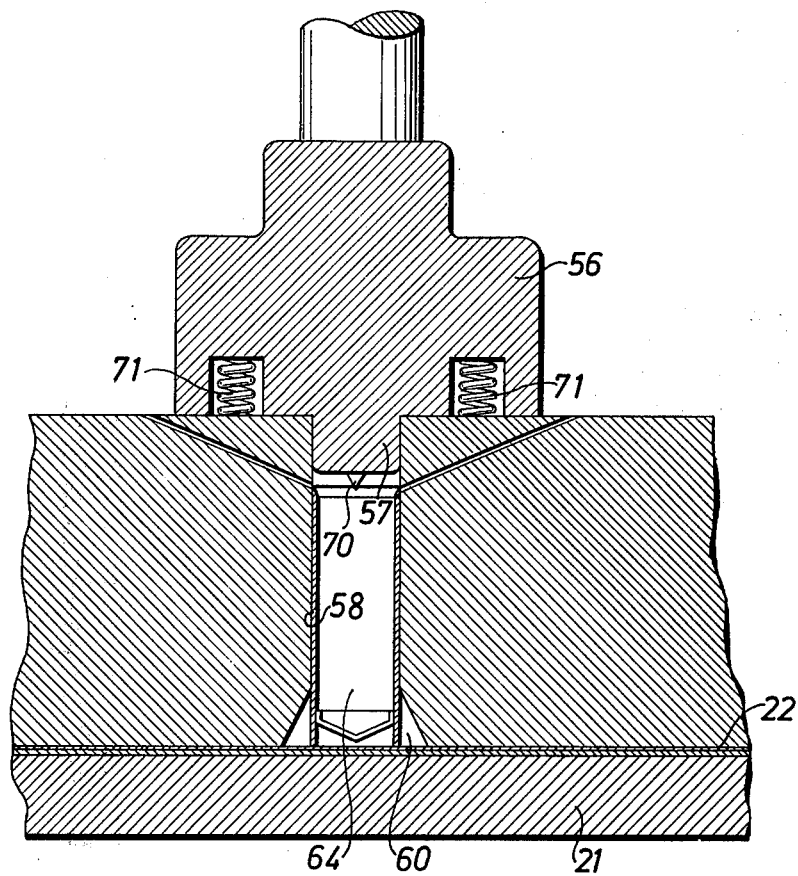
FIG. 11 is a partial section along the X—X plane, in an apparatus with directly actuated striking pins.

FIG. 11 illustrates a modified design of the individual striking-pin mechanisms. The cylindrical extension 57 of each clamping holder 56 carries a fixed striking pin 70. The clamping holder 56 is generally kept in an elevated position by means of four coil springs 71 that are supported in shallow bores. When the package of plates 21, 22 to be joined together has been advanced to its proper position the pneumatic cylinders are caused to lower simultaneously the corresponding clamping holders so that these will press against the cartridge-holding beam 59. The striking pins 70 will then cause all the blasting cartridges 64 in the cartridge-holding beam to detonate almost simultaneously, thus producing a point-by-point joining of the covering plate and the bed plate.

What we claim is:

1. An apparatus for point-by-point explosion welding of a covering plate of a corrosion-resistant metal, such as titanium, to a bed plate of another metal, such as steel, comprising
    a plate support beam,
    a blasting-charge holding beam extending along said plate support beam,
    guide means for said blasting-charge holding beam providing for a guided reciprocating translational motion thereof toward and away from said support beam,
    said blasting-charge holding beam being thus positionable away from said support beam to permit free movement of the plates to be welded between said beams for support upon said support beam,
    means for moving said blasting-charge holding beam to a lower position to press said plates against said support beam,
    a longitudinal blasting-charge rod,
    the side of said blasting-charge holding beam turned toward said support beam including a longitudinal channel accommodating said blasting-charge rod,
    said blasting-charge rod comprising a rod proper of wood or similar material containing a plurality of blasting units fitted in bores longitudinally spaced therein,
    a blasting cap connected by a fuse to said blasting units for producing simultaneous detonation of said blasting units and thus point-by-point explosion joining of the two plates while pressed together between said beams.

2. An apparatus according to claim 1 wherein
    said channel in said blasting-charge holding beam has a rectangular cross section,
    the height of said channel being smaller than the width of said channel,
    said blasting-charge rod having a corresponding cross section,
    said channel communicating upward with a narrower but deeper channel serving as an expansion chamber for the combustion gases.

3. An apparatus for point-by-point explosion welding of a covering plate of a corrosion-resistant metal, such as titanium, to a bed plate of another metal, such as steel, comprising
    an apparatus supporting frame,
    a plate support beam,
    a blasting-charge holding beam extending along said plate support beam,
    guide means for said blasting-charge holding beam providing for a guided reciprocating translational motion thereof toward and away from said support beam,
    said blasting-charge holding beam being thus positionable away from said support beam to permit free movement of the plates to be welded between said beams for support upon said support beam,
    said blasting-charge holding beam including a plurality of vertical through holes at spaced longitudinal positions therein,
    each through hole defining a chamber for a blasting cartridge with an individual blasting cap, means for moving said blasting-charge holding beam to a lower position to press said plates against said support beam comprising a plurality of pneumatic cylinders each fitted with a clamping holder and a striking pin and suspended from said supporting frame, one of said cylinders being positioned at each cartridge chamber, each cylinder piston in its lowest position exerting a local pressure on the holder against the plates to be welded.

4. An apparatus according to claim 3, wherein each clamping holder contains an axially movable striking pin and an associated striking-pin spring, a rotatable longitudinal camshaft mounted and supported within said blasting charge holding beam, said camshaft including a cam for each striking pin, said cams being operable when said camshaft is rotated to raise and then release simultaneously all the striking pins to thereby detonate the associated cartridges.

5. An apparatus according to claim 3 wherein
each striking pin is fixed to the associated cylinder piston to cause the blasting cartridge to detonate as the piston reaches its lowest position.

* * * * *